United States Patent
von Berg (10) Patent No.: US 10,209,099 B2
(45) Date of Patent: Feb. 19, 2019

(54) DEVICE AND METHOD FOR CHECKING A CLOCK SIGNAL OF A POSITION MEASURING DEVICE

(71) Applicant: DR. JOHANNES HEIDENHAIN GMBH, Traunreut (DE)

(72) Inventor: Martin von Berg, Übersee (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 365 days.

(21) Appl. No.: 14/965,563

(22) Filed: Dec. 10, 2015

(65) Prior Publication Data

US 2016/0169709 A1 Jun. 16, 2016

(30) Foreign Application Priority Data

Dec. 15, 2014 (DE) .................. 10 2014 225 867

(51) Int. Cl.
*G01D 5/244* (2006.01)
*H04L 7/00* (2006.01)
(Continued)

(52) U.S. Cl.
CPC ......... *G01D 5/244* (2013.01); *G01D 5/24457* (2013.01); *G01D 18/00* (2013.01);
(Continued)

(58) Field of Classification Search
CPC .............................. G01D 5/244; G01D 18/00
(Continued)

(56) References Cited

U.S. PATENT DOCUMENTS 5,687,103 A 11/1997 Hagl et al.
7,043,398 B2 5/2006 Hofbauer et al.
(Continued)

FOREIGN PATENT DOCUMENTS

DE 102008027902 A1 12/2009
DE 10 2008 031498 A1 1/2010
(Continued)

OTHER PUBLICATIONS

European Search Report issued in corresponding European Patent Application No. 15185475.9, dated Apr. 15, 2016.

*Primary Examiner* — Ricky Ngon
(74) *Attorney, Agent, or Firm* — Hunton Andrews Kurth LLP (57) ABSTRACT

In a device and a method for monitoring a clock signal of a position measuring device, which is connected to sequential electronics via a data transmission channel, and the data transmission channel has a data line, via which data signals are transmittable from an interface unit of the position measuring device to an interface unit of the sequential electronics, the interface unit of the position measuring device including a pulse generation unit, by which a test pulse is able to be generated based on the time pattern of the clock signal, and is transmittable via the data line to the interface unit of the sequential electronics. The interface unit of the sequential electronics includes a pulse measuring unit, by which a pulse duration of the test pulse in the time pattern of a clock signal of the sequential electronics is measurable in a functionally reliable manner and by which a measured value representing the pulse duration is able to be output to a control unit for analysis.

17 Claims, 4 Drawing Sheets

(51) Int. Cl.
  *G01D 18/00* (2006.01)
  *H04L 1/00* (2006.01)
  *H04L 7/04* (2006.01)
  *H04L 1/24* (2006.01)

(52) U.S. Cl.
  CPC ............... *H04L 1/00* (2013.01); *H04L 1/243* (2013.01); *H04L 7/0008* (2013.01); *H04L 7/044* (2013.01); *H04L 1/244* (2013.01); *H04L 7/0012* (2013.01)

(58) Field of Classification Search
  USPC ........................................................ 702/182
  See application file for complete search history.

(56) References Cited

U.S. PATENT DOCUMENTS

| | | | |
|---|---|---|---|
| 8,520,705 B2 | 8/2013 | Beaury et al. | |
| 2007/0271068 A1* | 11/2007 | Boerstler | G01R 29/0273 702/186 |
| 2011/0116501 A1* | 5/2011 | Beaury | H04L 5/14 370/389 |

FOREIGN PATENT DOCUMENTS

| | | |
|---|---|---|
| EP | 0293479 A1 | 12/1988 |
| EP | 0 660 209 | 6/1995 |
| GB | 2508788 A | 6/2014 |
| WO | WO-02095513 A2 | 11/2002 |

\* cited by examiner

DEVICE AND METHOD FOR CHECKING A CLOCK SIGNAL OF A POSITION MEASURING DEVICE

CROSS-REFERENCE TO RELATED APPLICATIONS

The present application claims priority to Application No. 10 2014 225 867.7, filed in the Federal Republic of Germany on Dec. 15, 2014, which is expressly incorporated herein in its entirety by reference thereto.

FIELD OF THE INVENTION

The present invention relates to a device for checking a clock signal of a position measuring device and to a method for checking a clock signal of a position measuring device.

BACKGROUND INFORMATION

A very common application field for position measuring devices is numerically controlled machine tools. In that case, they are used for determining actual positional values that are required by sequential electronics, e.g., a numerical control, for calculating setpoint values for control loops, by which the feed of a tool or a work piece is controlled. Rotary transducers or angle-measuring devices, for example, are directly or indirectly coupled to the shaft of a motor for this purpose, and linear measuring devices, for example, to a tool carriage that can be moved.

Modern position measuring devices generate digital absolute measuring values. These may be both positional values and measured values which are derived from temporal characteristics of positional values, such as speed values or acceleration values. Moreover, position measuring devices which additionally ascertain measured values from sensors that are situated inside or outside of the position measuring device are conventional, e.g., temperature or vibration sensors. The transmission of the measured values from the position measuring device to the sequential electronics takes place via digital data transmission interfaces. European Published Patent Application No. 0 660 209 describes a position measuring device having a digital data transmission interface. Complex analog and digital circuit blocks are required to provide the necessary functionalities, e.g., the acquisition of positional signals, processing of the positional signals into digital positional values or measured values derived therefrom, and the communication with the sequential electronics.

A central unit in position measuring devices is a clock generator, which generates a clock signal that is used as time base for many functional blocks of the position measuring device, such as for A/D converters, finite state machines, the digital data transmission interface or possibly a microprocessor or microcontroller as part of a central processing unit. If the frequency of the clock signal changes because of a malfunction, it may happen that functional blocks are operated outside their specification, which in turn may lead to measuring mistakes, sporadic downtimes, etc.

Some of the errors caused in this manner, especially if they result in faulty measuring values, may not be detected in the sequential electronics. In unfavorable cases, for example, the currently processed work piece in a machine tool may become unusable or the machine tool may even suffer damage as a result. Even worse than the possible financial loss is the injury risk that may arise for the operators. It is therefore important to ensure the proper functioning of the clock generator.

SUMMARY

Example embodiments of the present invention provide a device for monitoring a clock signal of a position measuring device.

According to an example embodiment of the present invention, a device is provided for monitoring a clock signal of a position measuring device, in which the position measuring device is connected to sequential electronics via a data transmission channel, and the data transmission channel has a data line via which the data signals are transmittable from an interface unit of the position measuring device to an interface unit of the sequential electronics. The interface unit of the position measuring device includes a pulse generation unit, by which a test pulse can be generated based on the time pattern of the clock signal and be transmitted to the interface unit of the sequential electronics via the data line. The interface unit of the sequential electronics includes a pulse measuring unit, by which a pulse duration of the test pulse in the time pattern of a clock signal of the sequential electronics is measurable in a functionally reliable manner and a measured value which represents the pulse duration is able to be output to a control unit for analysis.

Additionally, example embodiments of the present invention provide a method for monitoring the clock signal of such a position-measuring device.

According to an example embodiment of the present invention, a method for monitoring a clock signal of a position measuring device is provided, which is connected via a data transmission channel to sequential electronics, and the data transmission channel has a data line by which the data signals are transmittable from an interface unit of the position measuring device to an interface unit of the sequential electronics, the interface unit of the position measuring device including a pulse generation unit, which generates a test pulse based on the time pattern of the clock signal, and the test pulse is transmitted via the data line to the interface unit of the sequential electronics, and the interface unit of the sequential electronics including a pulse measuring unit, which measures a pulse duration of the test pulse in the time pattern of a clock signal of the sequential electronics in a functionally reliable manner and outputs a measured value representing the pulse duration to a control unit for analysis.

Further features and aspects of example embodiments of the present invention are described in more detail below with reference to the appended Figures.

DETAILED DESCRIPTION

Figure 1:
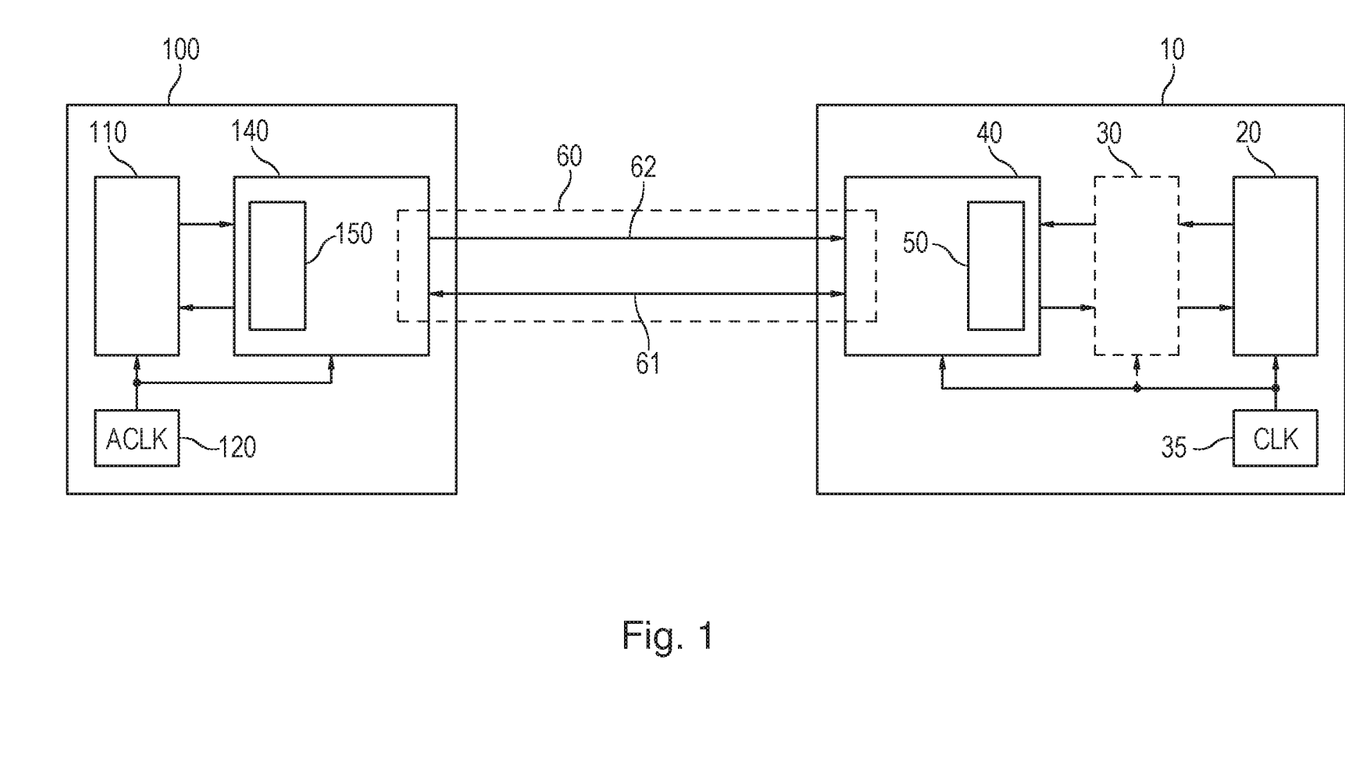
FIG. 1 is a block diagram of a position measuring device and sequential electronics, which are connected to each other via a data transmission channel.

FIG. 1 is a block diagram of a position measuring device 10 and sequential electronics 100, which are connected to each other via a data transmission channel 60. Position measuring device 10 and sequential electronics 100 are representative of automated system devices.

Position measuring device 10 includes measuring device components in the form of a position detection unit 20 and an optional processing unit 30. Position detection device 20 is suitably equipped for generating digital positional values. For example, it includes for this purpose a measuring standard having a graduation period, a scanning unit for its scanning, and a signal processing electronic system for generating the digital positional value from scanning signals of the scanning unit, which are generated by scanning the measuring graduation. Measuring standard and scanning unit are situated, e.g., in a conventional manner, such that they are able to move in relation to each other and are mechanically linked to machine components whose relative position is to be measured. If position measuring device 10 is a rotary transducer to be used for measuring the angular position of the shaft of an electric motor, then the scanning unit (or the housing of the rotary transducer) is mounted on a motor housing, for instance, and a shaft of the rotary transducer, which is connected to the measuring standard in a rotatably fixed manner, is connected to the motor shaft to be measured via a shaft coupling.

In addition, a clock generator 35 is disposed in position measuring device 10, especially for the purpose of providing a time basis or a defined time pattern for the digital circuit components. It supplies at least one clock signal CLK, which is made available to digital finite state machines, microprocessors, microcontrollers, etc.

The physical scanning principle on which position detection unit 20 is based is of no importance. For example, it may be an optical, magnetic, capacitive, or inductive scanning principle. In accordance with the required processing steps necessary for processing the scanning signals of the scanning unit into positional values, the signal processing electronics includes functional units, which carry out the processing steps such as amplification, signal correction (offset, amplitude, phase correction), interpolation, counting of graduation periods, A/D conversion, etc.

Suitable signal lines are provided for transmitting control signals and/or data between position detection unit 20 and processing unit 30. In particular, they are meant to transmit the positional values generated in position detection unit 20 to processing unit 30.

The positional values are possibly processed further in processing unit 30 in order to obtain output data. To do so, processing steps such as scaling, changing the data format, error correction, etc. may be required, which are executed in processing unit 30 in a purely digital fashion. However, output data may be not only positional values, but also speed or acceleration values, which are calculated in processing unit 30 from multiple, sequentially generated positional values.

An interface unit 40 is additionally included in position measuring device 10 for the communication with sequential electronics 100 on the one hand and measuring device components 20, 30 on the other. The transmission of the output data to sequential electronics 100, in particular, takes place with the aid of interface unit 40. Via suitable signal lines, the output data are transmitted to interface unit 40 from processing unit 30 or position detection unit 20. A clock signal, which serves as time basis for its internal sequences, is supplied to interface unit 40 as well. This may involve clock signal CLK.

The physical connection for the transmission of commands and data between interface unit 40 of position measuring device 10 and a corresponding interface unit 140 of sequential electronics 100 is established by data transmission channel 60, which includes a bidirectional data line 61 and a clock line 62 in this exemplary embodiment. Via clock line 62, an interface clock signal, which synchronizes the data transmission on data line 61, is transmitted from sequential electronics 100 to position measuring device 10. Such a system is described in European Published Patent Application No. 0 660 209, for example, which is expressly incorporated herein in its entirety by reference thereto.

As an alternative, two unidirectionally operated data lines may be provided. A precondition is merely that data signals can be transmitted from position measuring device 10 to sequential electronics 100 via data line 61. The transmission may take place in the form of data frames, for instance.

The physical transmission of the data signals may be carried out in a differential manner, for example, according to the widely used RS-485 standard, in which case line pairs have to be provided for data line 61 and clock line 62. The differential signals for the transmission are generated from ground-related (single-ended) signals in interface units 40, 140, or ground-related signals are in turn generated from incoming differential signals for further processing. Suitable transmit and receive components are provided for this purpose. The lines, possibly together with additional lines for the supply of current to the position measuring device, are situated in an interface cable.

As an alternative, the signal transmission may also take the form of an optical transmission, e.g., via optical waveguides.

The sequences in sequential electronics 100 are controlled by an internal control unit 110. If sequential electronics 100 is a numerical control or some other control device from the automation technology field, then control unit 110, for example, continually requests positional values from position measuring device 10 via interface unit 140 in order to obtain actual positional values, which it requires for control loops, for instance, for the precise positioning of mechanical components of a machine via a drive (servo drive).

A clock generator 120 is also situated in sequential electronics 100; it generates a clock signal ACLK, which is supplied to control unit 110 and interface unit 140 in order to form a time base or a time pattern.

A pulse generation unit 50 is provided in interface unit 40 of position measuring device 10. It provides for the generation of a test pulse 220, which has a pulse duration tm and is generated with the aid of clock signal CLK of position measuring device 10. Test pulse 220 is based on the time pattern of clock signal CLK of position measuring device 10. Test pulse 220 is transmittable to sequential electronics 100 via data line 61. There, pulse duration tm of test pulse 220 is measured by a functionally reliably arranged pulse measuring unit 150, which is situated in interface unit 140, and at least one measured value, which represents pulse duration tm of test pulse 220, is output to control unit 110 for evaluation purposes. The measurement of pulse duration tm is based on the time pattern of clock signal ACLK of sequential electronics 100.

The functionally reliable configuration of pulse measuring unit 150 is obtained by using a time measuring unit which generates changing measuring results in a forced manner, and/or by using multiple time measuring units which generate redundant measuring results. The functionally reliable configuration of pulse measuring unit 150 ensures that malfunctions of pulse measuring unit 150 may not cause the monitoring of clock signal CLK from position measuring device 10 to become ineffective, so that, for instance, valid measured values of pulse duration tm are output although no further measurements are taking place on account of a defect.

Figure 2:
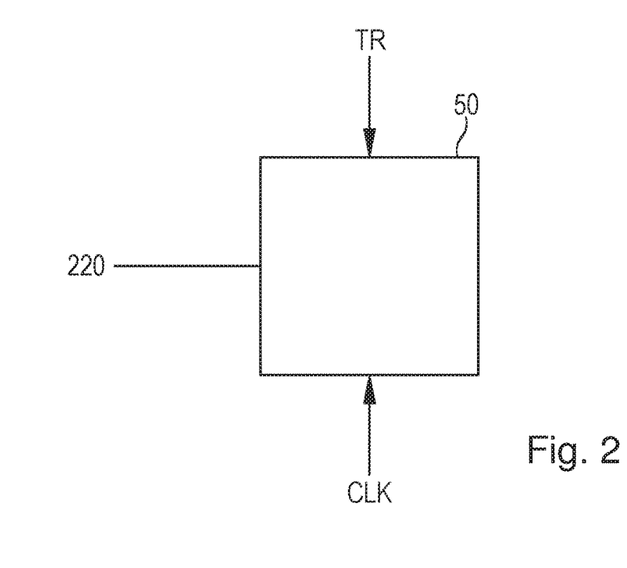
FIG. 2 illustrates a pulse generation unit.
Figure 3:
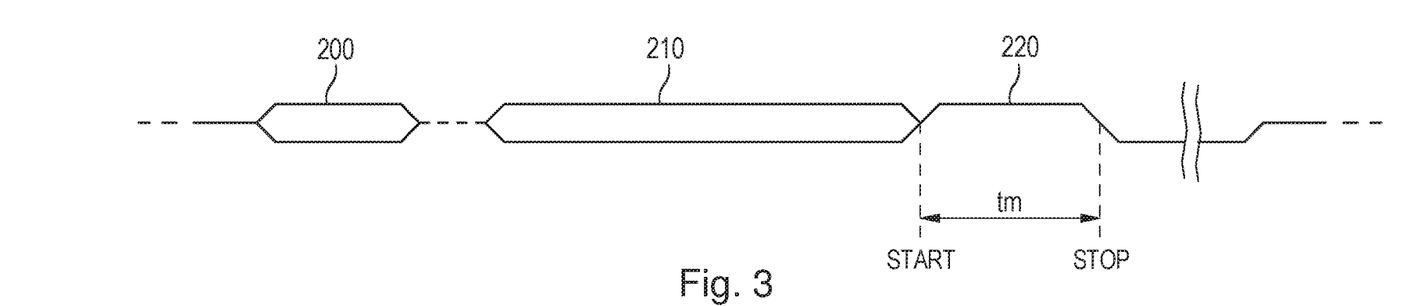
FIG. 3 illustrates a signal diagram of a command cycle in the case of a master-slave architecture.

The generation of test pulse 220 is explained in greater detail with reference to FIGS. 2 and 3, FIG. 2 showing an example embodiment of a pulse generation unit 50, and FIG. 3 showing a signal diagram of a data exchange typical of automation technology between position measuring device 10 and sequential electronics 100, which is expanded by the transmission of test pulse 220.

Pulse generation unit 50 is provided with clock signal CLK of position measuring device 10 and a trigger signal TR. As mentioned earlier already, clock signal CLK forms a time pattern, based on which functions of position measuring device 10 are running, in particular in position detection unit 20, processing unit 30 and possibly in interface unit 40 as well. It is also possible to use multiple clock signals having different frequencies in a position measuring device. They are often derived from a single clock signal, which is generated by clock generator 35. Clock signal CLK used in the exemplary embodiments is representative of a clock signal to be monitored.

Trigger signal TR is generated in interface unit 40 and defines the starting instant START of test pulse 220, which is output to sequential electronics 100 via data line 61. Pulse duration tm is specified by clock signal CLK. Pulse generation unit 50 may be based on a digital counter, whose counting steps are triggered by clock signal CLK. The arrival of trigger signal TR, for one, causes the start of the output of test pulse 220 and, for another, the start of the counting process. If the counter reaches a defined count value at a stop instant STOP after desired pulse duration tm has elapsed, then the output of test pulse 220 is ended and the counter is reset again. A comparison component may be provided to ascertain the defined count value.

The signal diagram illustrated in FIG. 3 shows a typical command cycle in a master-slave architecture, in which sequential electronics 100 is a master and position measuring device 10 is a slave. All data transmissions are initiated by the master in an architecture of this type. In the example, sequential electronics 100 transmits a command data frame 200 (e.g., with a position request command) to position measuring device 10, which thereupon responds by a response data frame 210 (with the requested positional value). Since data line 61 is operated bidirectionally, a switch of the data direction takes place between command data frame 200 and response data frame 210. The data transmission is not yet terminated following response data frame 210, but test pulse 220 having pulse duration tm is appended, which is delimited by start event START and stop event STOP. After test pulse 220 has been transmitted, data line 61 is switched to high impedance following a certain time interval (deactivation of the data drivers in position measuring device 10, represented by a medium signal potential), so that sequential electronics 100 is once again able to transmit a command data frame 200.

In a deviation from this example, it is also possible to transmit test pulse 220 separately, instead of response data frame 210 (e.g., in response to a corresponding command of sequential electronics 100) prior to response data frame 210, between two response data frames 210, or following a time interval after response data frame 210.

The interface clock signal on clock line 62 by which the transmission of data frames 200, 210 is synchronized is not shown in FIG. 3. Overall, the signal diagram is to be considered only schematically; signal levels, time durations etc. have been selected at random and depend on the physical transmission principle.

Since interference in clock signal CLK of position measuring device 10 (for instance static or dynamic frequency variations, missing clock pulses, short interference pulses, etc.) do not necessarily causes a breakdown in the generation of measured values or in the data transmission to sequential electronics 100, a reliable evaluation of received test pulses 220 is decisive for the suitability of the system of position measuring device 10 and sequential electronics 100 for applications that make high demands on the functional reliability. One malfunction of the pulse measuring unit that is difficult to discover is when the measured value no longer varies. This fault version may be caused by a defective counter which is used for the time measurement, when it always delivers the same value at the output, which means that the measured value "freezes." This error, for example, may also be created by a faulty register component. In such a case, the monitoring of clock signal CLK has been invalidated without being noticed. According to example embodiments of the present invention, the pulse measuring unit therefore has a functionally reliable configuration.

FIGS. 4 to 7 illustrate exemplary embodiments for pulse measuring units, which may be used in place of pulse measuring unit 150 in FIG. 1.

Figure 4:
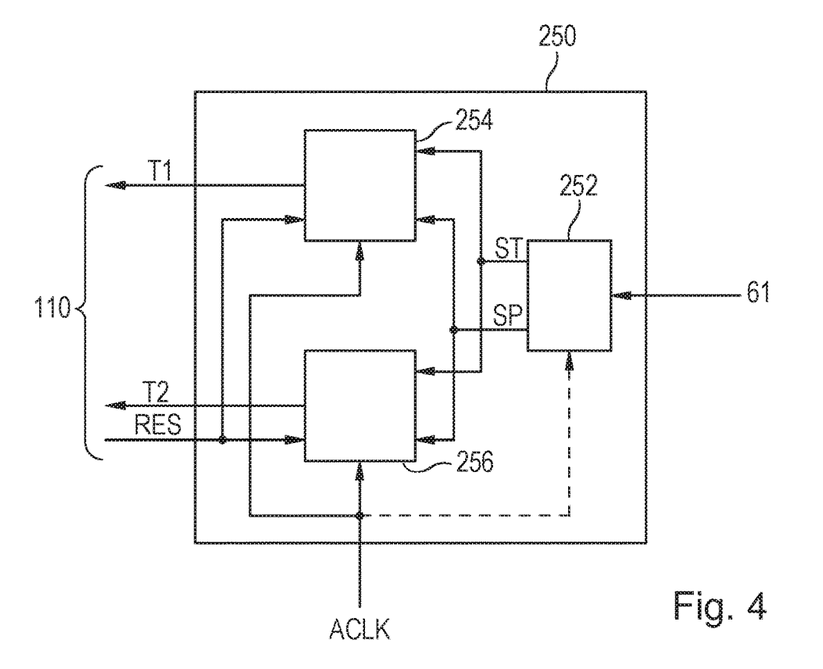
FIG. 4 illustrates an exemplary embodiment of a pulse measuring unit.

FIG. 4 shows an example embodiment of a pulse measuring unit 250. It includes a start/stop unit 252, a first time measuring unit 254, and a second time measuring unit 256.

Start/stop unit 252 is supplied with the data signals from data line 61. It is suitably arranged for outputting a start signal ST and a stop signal SP to time measuring units 254, 256 as a function of start event START and stop event STOP.

As illustrated in FIG. 3, it is possible to select as start event START the conclusion of the receiving of a response data frame 210, characterized by the final signal flank of response data frame 210, or the arrival/detection of the last bit of response data frame 210 (stop bit of the data transmission) in interface unit 140. The information about the conclusion of the receiving of response data frame 210 may be signaled to the start/stop unit by interface unit 140, which analyzes the data frames that arrive from position measuring device 10. Stop event STOP is the signal flank that follows next after start event START in the selected example.

Clock signal ACLK of sequential electronics 100 may be supplied to start/stop unit 252, for instance for scanning the arriving signals in the time pattern of clock signal ACLK and to thereby detect changes in levels (signal flanks).

For the sake of completeness, it should be pointed out that it is also possible that multiple clock signals are present in sequential electronics 100, either derived from a master clock signal or else generated independently of each other. Clock signal ACLK is representative of a clock signal that is suitable for measuring the duration of test pulse 220.

Clock signal ACLK is also supplied to time measuring units 254, 256 and serves as time basis for the time measurements. Once start signal ST has arrived, time measuring units 254, 256 start the time measurements, and the arrival of stop signal SP concludes the time measurements. The result of the measurements are measured values T1, T2, which represent the pulse duration of test pulse 220 and are output to control unit 110, so that the functioning of clock signal CLK of position measuring device 10 can be evaluated. Time measuring units 254, 256 are then reset via a reset signal RES.

For example, time measuring units 254, 256 may be arranged as counters, whose count value is incremented in the time pattern of clock signal ACLK of sequential electronics 100 from the instant when start signal ST arrives, to the instant when stop signal SP arrives. The counter values (measured values T1, T2) then correspond approximately to pulse duration tm of test pulse 220 (at a time resolution of the time pattern of clock signal ACLK).

This solution attains a high degree of functional reliability since two redundantly generated measured values T1, T2 are available for the analysis.

Figure 5:
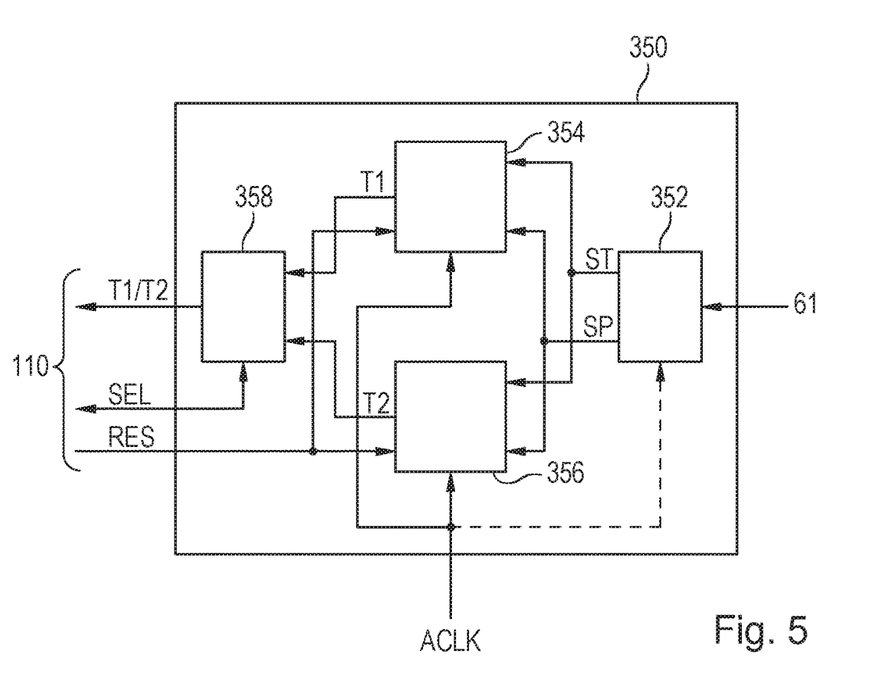
FIG. 5 illustrates another exemplary embodiment of a pulse measuring unit.

FIG. 5 shows a further exemplary embodiment of a pulse measuring unit 350. Apart from a start/stop unit 352, a first time measuring unit 354 and a second time measuring unit 356, it also includes a multiplexer 358.

The function of start/stop unit 352 corresponds to that of start/stop unit 252 of the previous exemplary embodiment.

Measured values T1, T2, measured by time measuring units 354, 356, are supplied to multiplexer 358, and control unit 110 is able to select one of measured values T1, T2 for the evaluation in each case, using a selection signal SEL.

In contrast to the above-described exemplary embodiment, this approach has the advantage of halving the number of connection lines required for the output of measured values T1, T2 to control unit 110. On the other hand, only one new control line for selection signal SEL is necessary. In the ongoing operation when, for example, the sequential electronics continuously requests positional values from position-measuring device 10 at short time intervals, it may also suffice if only one of measured values T1, T2 is analyzed in alternation for each transmission of a response data frame 210. This further reduces the computational work for the evaluation. In one variant, control line SEL may also be generated in pulse measuring unit 350, so that only one of measured values T1, T2 is automatically output to control unit 110 for the evaluation in alternation.

In the unlikely but theoretically possible case that selection signal SEL is not available and the same measured value T1, T2 of only one time measuring units 354, 356 is output and analyzed at all times, the above-described problem once again arises that in the event of "freezing" of time measuring unit 354, 356, whose measured value is being analyzed, there is no possibility of becoming aware of the fault. The monitoring of clock signal CLK of the position measuring device would be invalidated.

In order to make even this extremely unlikely fault case detectable, time measuring units 354, 356 are arranged such that first time measuring unit 354 has a measuring behavior that differs from the measuring behavior of second time measuring unit 356, so that measured values T1, T2 differ from each other as a result. Some pertinent examples are:
different counting direction of the counters used,
different encoding of measured values T1, T2,
a known mathematical correlation (e.g., offset) between measured values T1, T2.

This ensures that measured values T1, T2 of the two time measuring units 354, 356 differ from each other in a reliable manner. Because the measuring behavior of each time measuring unit 354, 356 is known, it is possible again to infer the measured time duration tm of test pulse 220 in control unit 110 from measured values T1, T2. "Freezing" of one of time measuring units 354, 356 is able to be detected in a reliable manner.

The use of time measuring units having different counting behaviors also makes it possible to further enhance the functional reliability of pulse measuring unit 250 of the preceding exemplary embodiment.

Figure 6:
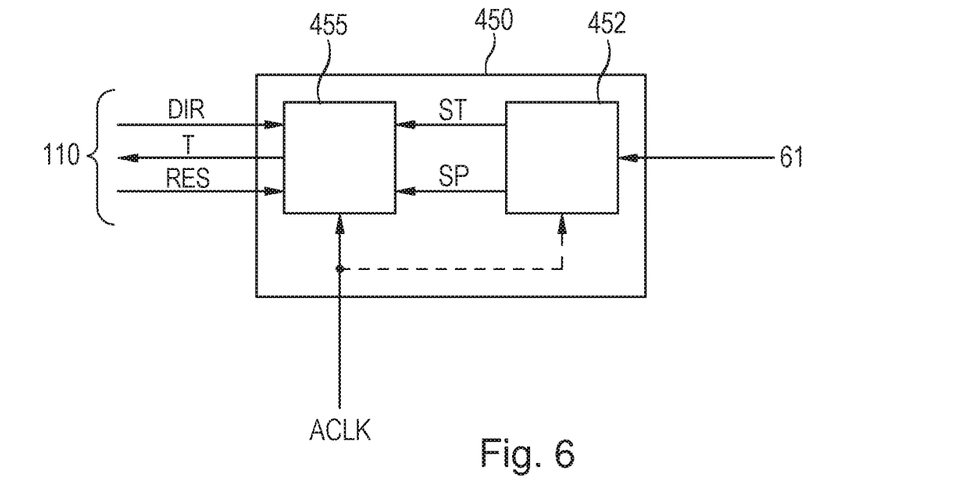
FIG. 6 illustrates a further exemplary embodiment of a pulse measuring unit.

FIG. 6 illustrates another exemplary embodiment of a pulse measuring unit 450. It includes a start/stop unit 452, which is unchanged from the preceding exemplary embodiments, and a time measuring unit 455.

Time measuring unit 455 is arranged such that it is forced to generate a changing measured value T. In other words, unnoticed "freezing" of the measured value or time measuring unit 455 is prevented by a mandatory change of measured value T, which represents pulse duration tm of test pulse 220, in each measuring operation. This can be achieved by configuring time measuring unit 455 such that its measuring behavior is variable. For example, the counting direction of a counter carrying out the time measurement in time measuring unit 455 can be switched after each measurement under the control of control unit 110 via a directional signal DIR or also automatically. Alternatives are:
changing the encoding of successive measured values T, or
changing a mathematical correlation (e.g., offset) between successive measured values T.

Measured value T, which represents pulse duration tm of test pulse 220, is supplied again to control unit 110 for evaluation. Here, too, a reset signal RES for resetting the counter may be provided.

This variant is especially advantageous because it requires only very few functional units at a negligently more complex configuration of time measuring unit 455.

Figure 7:
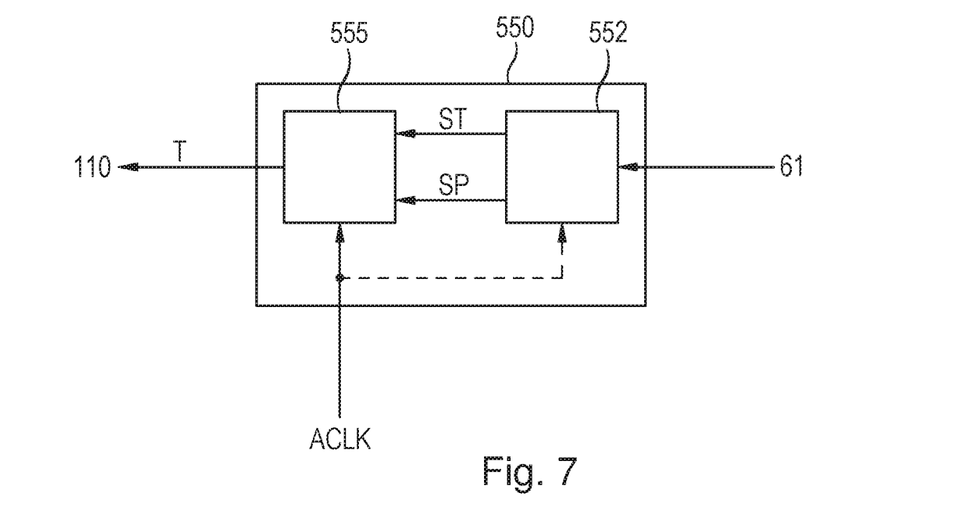
FIG. 7 illustrates another exemplary embodiment of a pulse measuring unit.

FIG. 7 shows another exemplary embodiment of a pulse measuring unit 550. It, too, includes an unchanged start/stop unit 552 and a time measuring unit 555.

As also in the preceding exemplary embodiment, time measuring unit 555 is based on a forced change of measured value T during each measurement. However, here this is achieved in that time measuring unit 555 has a larger measuring range than required for measuring a test pulse 220. With the aid of time measuring unit 555, multiple test pulses 220 are measurable in succession and at an overflow of the measuring range, time measuring unit 555 restarts the measuring at zero. This causes successive measurements to be summed up in time measuring unit 555. Taking a possible overflow into account, control unit 110 is able to ascertain and analyze currently measured pulse duration tm of test pulse 220 using the measured value obtained during the preceding measurement. In this exemplary embodiment as well, "freezing" of time measuring unit 555 is able to be detected in a reliable manner.

Control signals DIR, RES, SEL of control unit 110 to pulse measuring unit 550 can be omitted.

What is claimed is:

1. A device for monitoring a clock signal of a position measuring device, which is connected to sequential electronics via a data transmission channel, and the data transmission channel has a data line, via which data signals are transmittable from an interface unit of the position measuring device to an interface unit of the sequential electronics, the interface unit of the position measuring device including a pulse generation unit, by which a test pulse is generatable based on a time pattern of the clock signal, and the test pulse is transmittable via the data line to the interface unit of the sequential electronics, and the interface unit of the sequential electronics including a pulse measurement unit, by which a pulse duration of the test pulse in the time pattern of a clock signal of the sequential electronics is measurable and by which a measured value representing the pulse duration is outputtable to a control unit for evaluation.

2. The device according to claim 1, wherein the pulse measurement unit includes a start/stop unit adapted to output a start signal and a stop signal as a function of a start event and a stop event that restrict the test pulse, to at least one time measuring unit.

3. The device according to claim 1, wherein the pulse measurement unit includes a first time measurement unit and a second time measurement unit, by which redundant measured values are generatable that represent the time duration of the test pulse.

4. The device according to claim 3, wherein the first time measurement unit has a different measurement behavior than the second time measurement unit.

5. The device according to claim 3, wherein the pulse measurement unit includes a multiplexer to which the measured values are supplied, and which is adapted to select whether the first measured value or the second measured value is output to the control unit.

6. The device according to claim 1, wherein the pulse measurement unit includes a time measurement unit adapted to generate a forcibly changing measured value that represents the time duration of the test pulse.

7. A method for monitoring a clock signal of a position measuring device, which is connected to sequential electronics via a data transmission channel, and the data transmission channel has a data line, via which data signals are transmittable from an interface unit of the position measuring device to an interface unit of the sequential electronics, comprising:
   generating a test pulse based on a time pattern of the clock signal by a pulse generation unit of the interface unit of the position measuring device;
   transmitting the test pulse via the data line to the interface unit of the sequential electronics; and
   measuring a pulse duration in the time pattern of the clock signal by a pulse measurement unit of the interface unit of the sequential electronics; and
   outputting, by the pulse measurement unit, a measured value representing the pulse duration to a control unit for evaluation.

8. The method according to claim 7, further comprising outputting, to at least one time measurement unit, by a start/stop unit of the pulse measurement unit, a start signal and a stop signal as a function of a start event and a stop event that restrict the test pulse.

9. The method according to claim 7, further comprising generating, by a first time measurement unit and a second time measurement unit of the pulse measurement unit, redundant measured values that represent the time duration of the test pulse.

10. The method according to claim 9, wherein the first time measurement unit has a different measurement behavior than the second time measurement unit.

11. The method according to claim 7, further comprising generating, by a time measurement unit of the pulse measurement unit, a forcibly changing measured value that represents the time duration of the test pulse.

12. A system, comprising:
   a position measuring device including an interface unit;
   sequential electronics including an interface unit; and
   a data transmission channel connecting the position measuring device and the sequential electronics, the data transmission channel including a data line adapted to transmit data signals from the interface unit of the position measuring device to the interface unit of the sequential electronics;
   wherein the interface unit of the position measuring device includes a pulse generation unit adapted to generate a test pulse based on a time pattern of a clock signal of the position measuring device;
   wherein the data line is adapted to transmit the test pulse to the interface unit of the sequential electronics;
   wherein the interface unit of the sequential electronics includes a pulse measurement unit adapted to measure a pulse duration of the test pulse in the time pattern of a clock signal of the sequential electronics and to output, to a control unit for evaluation, a measured value representing the pulse duration.

13. The system according to claim 12, wherein the pulse measurement unit includes a start/stop unit adapted to output a start signal and a stop signal as a function of a start event and a stop event that restrict the test pulse, to at least one time measuring unit.

14. The system according to claim 12, wherein the pulse measurement unit includes a first time measurement unit and a second time measurement unit, adapted to generate redundant measured values that represent the time duration of the test pulse.

15. The system according to claim 14, wherein the first time measurement unit has a different measurement behavior than the second time measurement unit.

16. The system according to claim 14, wherein the pulse measurement unit includes a multiplexer to which the measured values are supplied, and which is adapted to select whether the first measured value or the second measured value is output to the control unit.

17. The system according to claim 12, wherein the pulse measurement unit includes a time measurement unit adapted to generate a forcibly changing measured value that represents the time duration of the test pulse.

* * * * *